UNITED STATES PATENT OFFICE.

CHARLES TORLEY, OF BRUSSELS, BELGIUM, AND OSKAR MATTER, OF TROISDORF, GERMANY.

PROCESS FOR THE MANUFACTURE OF NITROUS OXID.

1,098,305.     Specification of Letters Patent.     Patented May 26, 1914.

No Drawing.     Application filed October 21, 1913. Serial No. 796,433.

*To all whom it may concern:*

Be it known that we, CHARLES TORLEY and OSKAR MATTER, respectively a subject and a citizen of the Belgian King and the Swiss Confederation, residing, respectively, at Brussels, Belgium, and Troisdorf, Germany, have invented new and useful Improvements in Processes for the Manufacture of Nitrous Oxid; and we do hereby declare the following to be a full, clear, and exact description of the same.

The processes hitherto employed for the manufacture of nitrous oxid consist either in heating pure ammonium nitrate or a mixture of ammonium sulfate and a nitrate (German Patent No. 71279), and are discontinuous. Moreover all those processes have the great drawback that there is a risk of explosion when they are carried out on a large scale since the process of decomposition of ammonium nitrate according to the equation:

$$NH_4NO_3 = N_2O + 2H_2O$$

is highly exothermic, there is a risk of a rapid increase in temperature and consequent overheating as soon as the nitrous oxid begins to be evolved; this state of affairs is very liable to produce a violent reaction and may even cause an explosion.

The improved process forming the subject of the present invention has for its object to obviate those drawbacks.

It consists in introducing the ammonium nitrate to the reaction vessel in a continuous manner either in a solid form (such as loose crystals or compressed tablets or pills) by means of a suitable feeding device or in dropping the ammonium nitrate in the form of a solution continuously into the decomposing vessel. This reaction vessel contains any suitable filling material for instance, sand, shot, molten metal, salts, mixtures of salts, for instance sodium nitrate and potassium nitrate and other mixtures.

In carrying out the improved process the reaction vessel is maintained at or above the decomposition temperature of ammonium nitrate. Into this heated vessel ammonium nitrate in the solid form or in solution is introduced continuously so that the quantities of ammonium nitrate which are introduced into the decomposing vessel, are continuously decomposed in accordance with the aforesaid equation and thus produce a continuous stream of nitrous oxid. For the purpose of increasing the uniformity of the reaction process during the decomposition a stirring apparatus is provided for keeping the contents of the reaction vessel in continuous movement. The stream of nitrous oxid issuing from the decomposing vessel is freed from impurities by the usual means.

We claim:—

A process for the manufacture of nitrous oxid which consists in introducing ammonium nitrate continuously into a reaction vessel which contains a filling material that is heated to or above the decomposition temperature of ammonium nitrate, and maintaining the reaction mass in motion during the process by means of a stirring apparatus.

In testimony whereof, we have signed our names to this specification in the presence of two subscribing witnesses.

CHARLES TORLEY.
OSKAR MATTER.

Witnesses:
    J. OAKSL,
    CHAS. A. JOHNSON.